United States Patent
D'Aluisio et al.

(10) Patent No.: US 9,828,054 B2
(45) Date of Patent: Nov. 28, 2017

(54) BICYCLE WITH COMPLIANT SEAT POST INTERFACE

(71) Applicant: Specialized Bicycle Components, Inc., Morgan Hill, CA (US)

(72) Inventors: Christopher P. D'Aluisio, Corralitos, CA (US); David Tyson Buckenberger, Morgan Hill, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 15/049,847

(22) Filed: Feb. 22, 2016

(65) Prior Publication Data

US 2016/0244114 A1    Aug. 25, 2016

Related U.S. Application Data

(60) Provisional application No. 62/119,983, filed on Feb. 24, 2015.

(51) Int. Cl.
*B62J 1/02* (2006.01)
*B62J 1/08* (2006.01)
(Continued)

(52) U.S. Cl.
CPC . *B62J 1/08* (2013.01); *B62J 1/02* (2013.01); *B62K 19/18* (2013.01); *B62K 19/36* (2013.01)

(58) Field of Classification Search
CPC ......... B62J 1/02; B62J 1/08; B62J 1/10; B62J 2001/085; B62K 19/36
See application file for complete search history.

(56) References Cited

U.S. PATENT DOCUMENTS

| | | | | |
|---|---|---|---|---|
| 1,385,129 A | * | 7/1921 | Heise | B62K 19/36 403/218 |
| 2,623,573 A | * | 12/1952 | Di Gaetano | B62J 1/06 280/283 |

(Continued)

FOREIGN PATENT DOCUMENTS

| | | | | |
|---|---|---|---|---|
| DE | 4242119 A1 | * | 6/1994 | B62J 1/08 |
| DE | 29500596 U1 | * | 2/1995 | B62J 1/08 |

(Continued)

OTHER PUBLICATIONS

International Search Report and Written Opinion for Application No. PCT/US2016/019431 dated May 5, 2016 (14 pages).

*Primary Examiner* — Joseph M Rocca
*Assistant Examiner* — Maurice L Williams
(74) *Attorney, Agent, or Firm* — Michael Best & Friedrich LLP

(57) ABSTRACT

A bicycle includes front and rear wheels, a frame supported on the front and rear wheels, and a seat post. The frame includes a seat tube having an upper end with a rear wall and a side wall, and the seat post is positioned at least partially inside the seat tube and is secured to the seat tube at a securing location spaced from the upper end. The rear wall of the upper end of the seat tube is spaced from the seat post by a first gap, and the side wall of the upper end of the seat tube is spaced from the seat post by a second gap that is smaller than the first gap. The seat tube has an effective length from a crank axis to the upper end, and the securing location is preferably spaced from the upper end by a distance that is at least 5% of the effective length.

10 Claims, 6 Drawing Sheets

(51) Int. Cl.
*B62K 19/18* (2006.01)
*B62K 19/36* (2006.01)

(56) References Cited

U.S. PATENT DOCUMENTS

| | | | |
|---|---|---|---|
| 2,710,207 A | | 6/1955 | Mueller |
| 2,770,479 A | * | 11/1956 | Hilber ................. B62K 19/36 280/281.1 |
| 4,111,575 A | * | 9/1978 | Hoshino ............... F16B 7/1418 248/413 |
| 4,120,512 A | * | 10/1978 | Newlands ............ B62K 19/36 280/281.1 |
| 4,417,744 A | * | 11/1983 | Spear ..................... B62J 1/08 248/411 |
| 4,789,172 A | * | 12/1988 | Mueller ................ B62K 19/36 280/281.1 |
| 4,919,378 A | * | 4/1990 | Iwasaki ................. B62K 19/36 248/295.11 |
| 5,351,980 A | * | 10/1994 | Huang ................... B62K 19/36 280/281.1 |
| 6,095,538 A | * | 8/2000 | Maret ..................... B62J 1/06 267/132 |
| 6,142,699 A | * | 11/2000 | Pao ....................... F16B 7/1454 403/109.5 |
| 6,176,640 B1 | * | 1/2001 | Gonczi ................... B62J 1/08 403/12 |
| 6,220,581 B1 | * | 4/2001 | Mueller ................ B62K 19/36 267/64.11 |
| 6,349,957 B2 | * | 2/2002 | Smith ......................... 267/132 |
| 6,799,773 B2 | * | 10/2004 | Kao ........................ B62J 1/08 280/281.1 |
| 6,896,438 B1 | * | 5/2005 | Chen ..................... B62K 19/36 403/290 |
| 7,125,030 B2 | * | 10/2006 | D'Aluisio ............. B62K 19/36 267/131 |
| 8,540,268 B1 | * | 9/2013 | Soucek ................. B62K 19/02 280/281.1 |
| 8,807,152 B2 | * | 8/2014 | Lenhart ......................... 135/75 |
| 9,415,824 B2 | * | 8/2016 | Maier ...................... B62J 1/08 |
| 2001/0047572 A1 | * | 12/2001 | Cassel .................. F16L 21/065 24/279 |
| 2002/0056795 A1 | * | 5/2002 | Dal Pra' ................... B62J 1/08 248/230.5 |
| 2002/0148323 A1 | * | 10/2002 | Thomson ............... B62K 19/36 74/551.1 |
| 2005/0012365 A1 | * | 1/2005 | Chiang ...................... B62J 1/08 297/195.1 |
| 2005/0169698 A1 | * | 8/2005 | Conroy .................... B62J 1/08 403/109.1 |
| 2005/0248118 A1 | * | 11/2005 | D'Aluisio .............. B62K 19/36 280/275 |
| 2006/0078376 A1 | * | 4/2006 | Liao ........................... B62J 1/02 403/378 |
| 2007/0132203 A1 | | 6/2007 | Yamakoshi |
| 2008/0258517 A1 | * | 10/2008 | Julliard ................. B62K 19/36 297/215.13 |
| 2008/0298886 A1 | * | 12/2008 | Chen ..................... B62K 19/36 403/373 |
| 2008/0303241 A1 | * | 12/2008 | Liu ........................ B62K 19/36 280/281.1 |
| 2010/0254756 A1 | * | 10/2010 | Chiang ................. B62K 19/36 403/373 |
| 2011/0042543 A1 | * | 2/2011 | Tseng ..................... B62K 19/36 248/503.1 |
| 2011/0248470 A1 | | 10/2011 | Chubbuck |
| 2011/0254246 A1 | * | 10/2011 | Pryde ..................... B62K 19/36 280/287 |
| 2012/0326415 A1 | * | 12/2012 | Janssen ..................... B62J 1/08 280/281.1 |
| 2015/0210341 A1 | * | 7/2015 | Chen ..................... B62K 19/36 297/215.13 |
| 2015/0298760 A1 | * | 10/2015 | Bigard ................... B62K 19/36 280/281.1 |
| 2015/0321719 A1 | * | 11/2015 | Schmidt .................... B62K 3/02 280/261 |
| 2016/0016632 A1 | * | 1/2016 | Wagner ..................... B62J 1/08 280/281.1 |
| 2016/0059919 A1 | * | 3/2016 | Kim .......................... B62J 1/08 248/286.1 |

FOREIGN PATENT DOCUMENTS

| | | | | |
|---|---|---|---|---|
| DE | 4410523 A1 | * | 9/1995 | ............. B62H 5/001 |
| DE | 29602992 U1 | * | 4/1996 | ............... B62J 1/08 |
| DE | 29916193 U1 | * | 11/1999 | ............... B62J 1/08 |
| DE | 29906289 U1 | * | 12/1999 | ............... B62J 1/08 |
| FR | 2928619 A1 | * | 9/2009 | ............. B62K 19/36 |
| FR | 2928619 A1 | * | 9/2009 | ............. B62K 19/36 |
| FR | 2977228 A1 | * | 1/2013 | ............... B62J 1/08 |

* cited by examiner

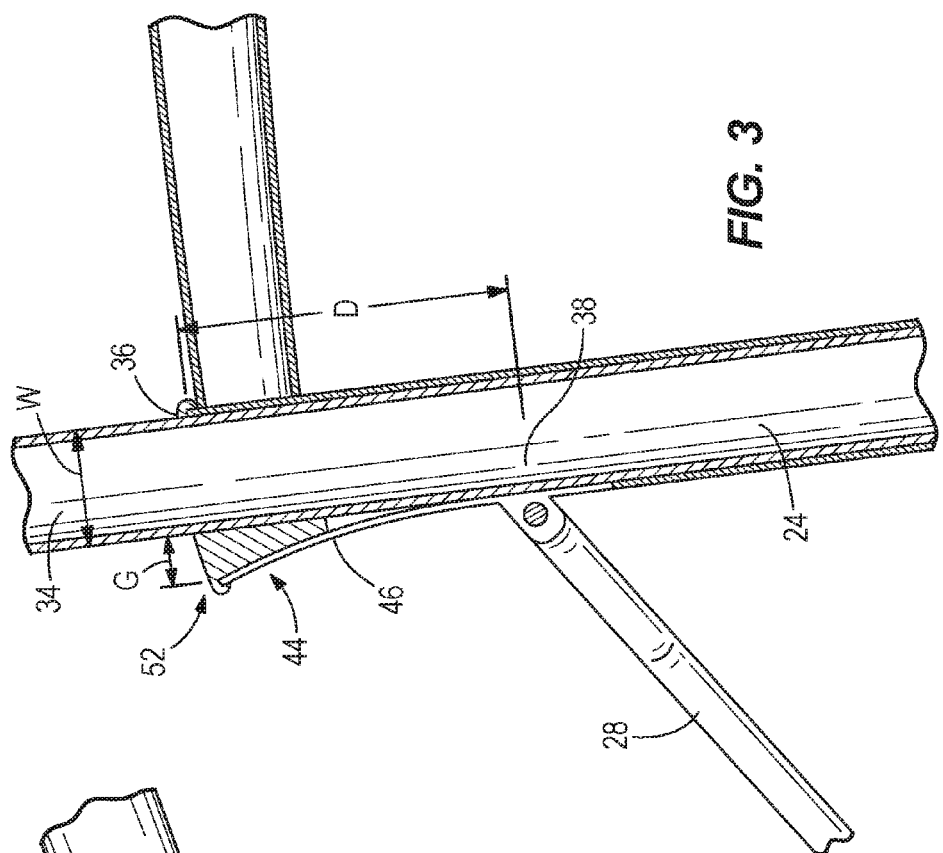
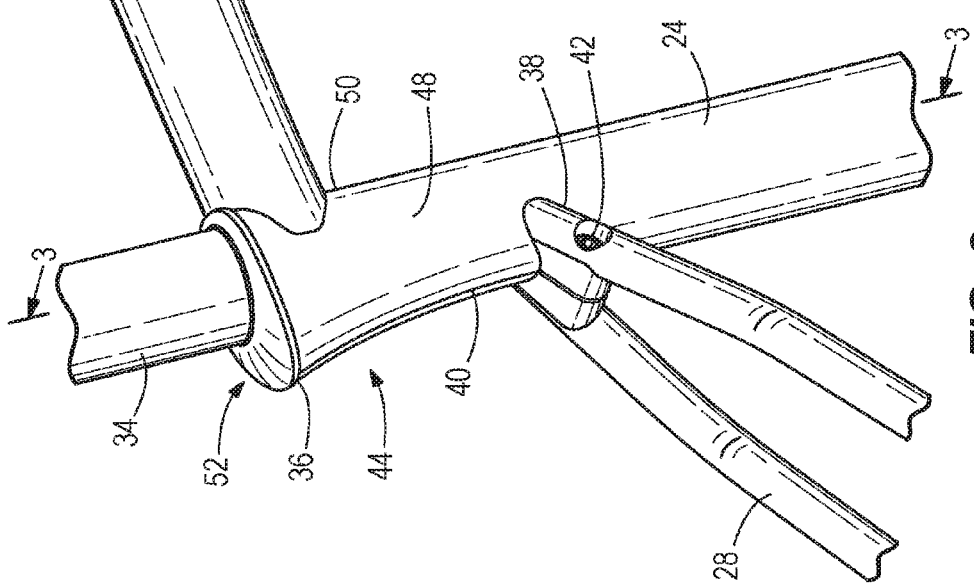

BICYCLE WITH COMPLIANT SEAT POST INTERFACE

BACKGROUND

The present invention relates generally to bicycles and specifically to bicycle frames having features for reducing the amount of road shock transmitted to the rider.

Bicycles designed for paved roads commonly have a rigidly mounted rear wheel, which is light weight and provides rear end stiffness that is desired by most serious road cyclists. In some riding conditions, such as when riding long distances or over rough roads, it would be desirable to reduce the amount of shock or vibration transmitted from the road to the rider. One way to accomplish this is to make the rear end of the bicycle compliant, which facilitates absorbing of the shock and vibration. However, such attempts to make the rear end of a road bike compliant have commonly resulted in an increase in weight or loss of rear end lateral stiffness, both of which are undesired.

SUMMARY

The present invention provides a bicycle comprising front and rear wheels, a frame supported on the front and rear wheels, and a seat post. The frame includes a seat tube having an upper end with a rear wall and a side wall, and the seat post is positioned at least partially inside the seat tube and is secured to the seat tube at a securing location spaced from the upper end. The rear wall of the upper end of the seat tube is spaced from the seat post by a first gap, and the side wall of the upper end of the seat tube is spaced from the seat post by a second gap that is smaller than the first gap. Preferably, the second gap has a dimension that is substantially zero such that the seat post contacts the side wall of the seat tube. Also, preferably the frame further includes a seatstay coupled to the seat tube substantially at the securing location.

In one embodiment, the seat post has a front/rear width and the gap is at least 1% (and preferably at least 2% or at least 3%) of the front/rear width. In addition, the frame can further include a crank axis such that the seat tube has an effective length from the crank axis to the upper end. In this embodiment, the securing location is preferably spaced from the upper end by a distance that is at least 5% (and preferably at least 8% or at least 10%) of the effective length. The seat tube can include a slot extending from the upper end to the securing location. In a different embodiment, the seat tube includes a cutout at the securing location, and the bicycle further includes a clamping member positioned in the cutout to secure the seat post relative to the seat tube.

Other aspects of the invention will become apparent by consideration of the detailed description and accompanying drawings.

BRIEF DESCRIPTION OF THE DRAWINGS

FIG. 2 is an enlarged perspective view of a seat tube/frame interface of the bicycle in FIG. 1.

FIG. 3 is a section view taken along line 3-3 in FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
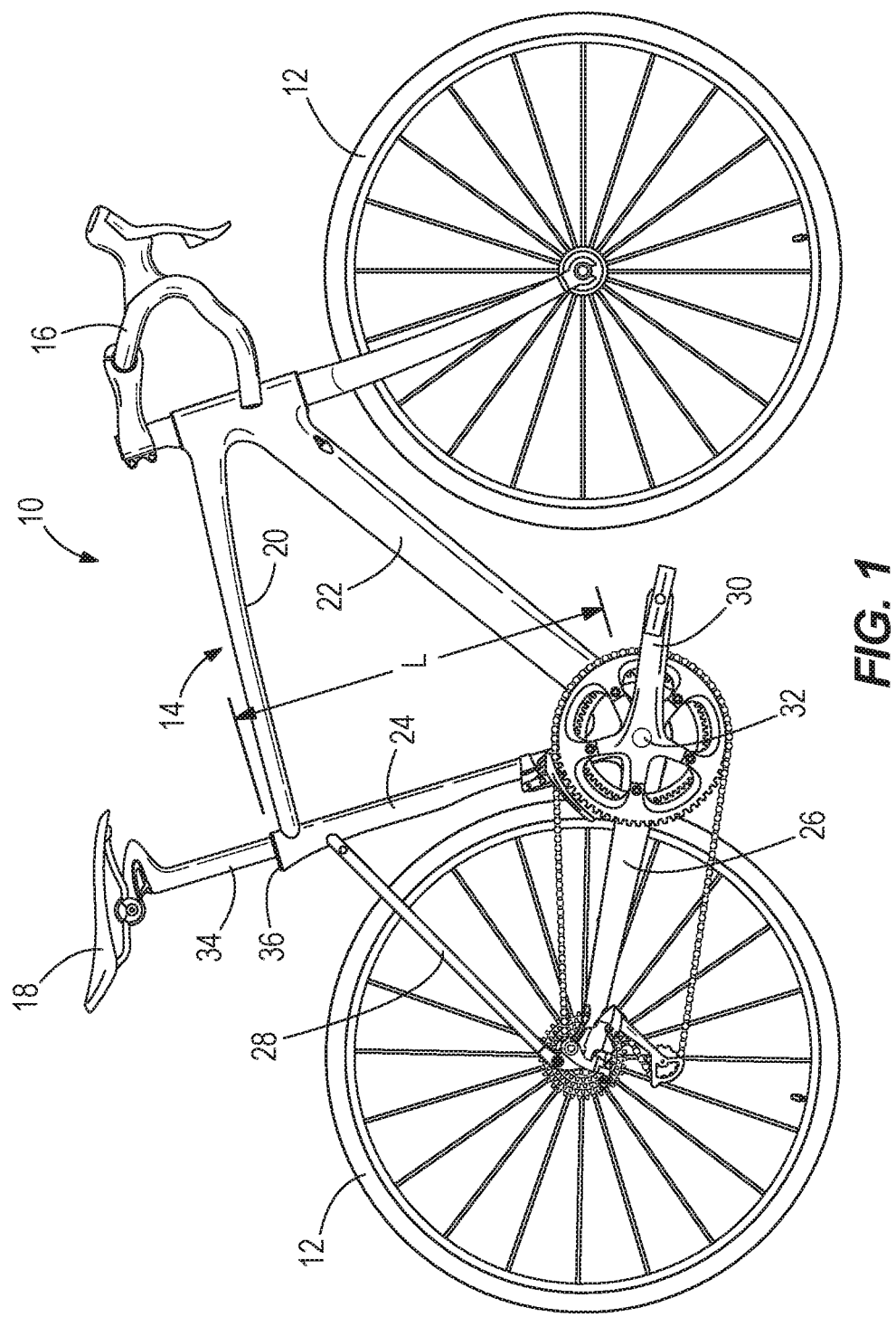
FIG. 1 is a side view of a bicycle embodying the present invention.
Figure 4:
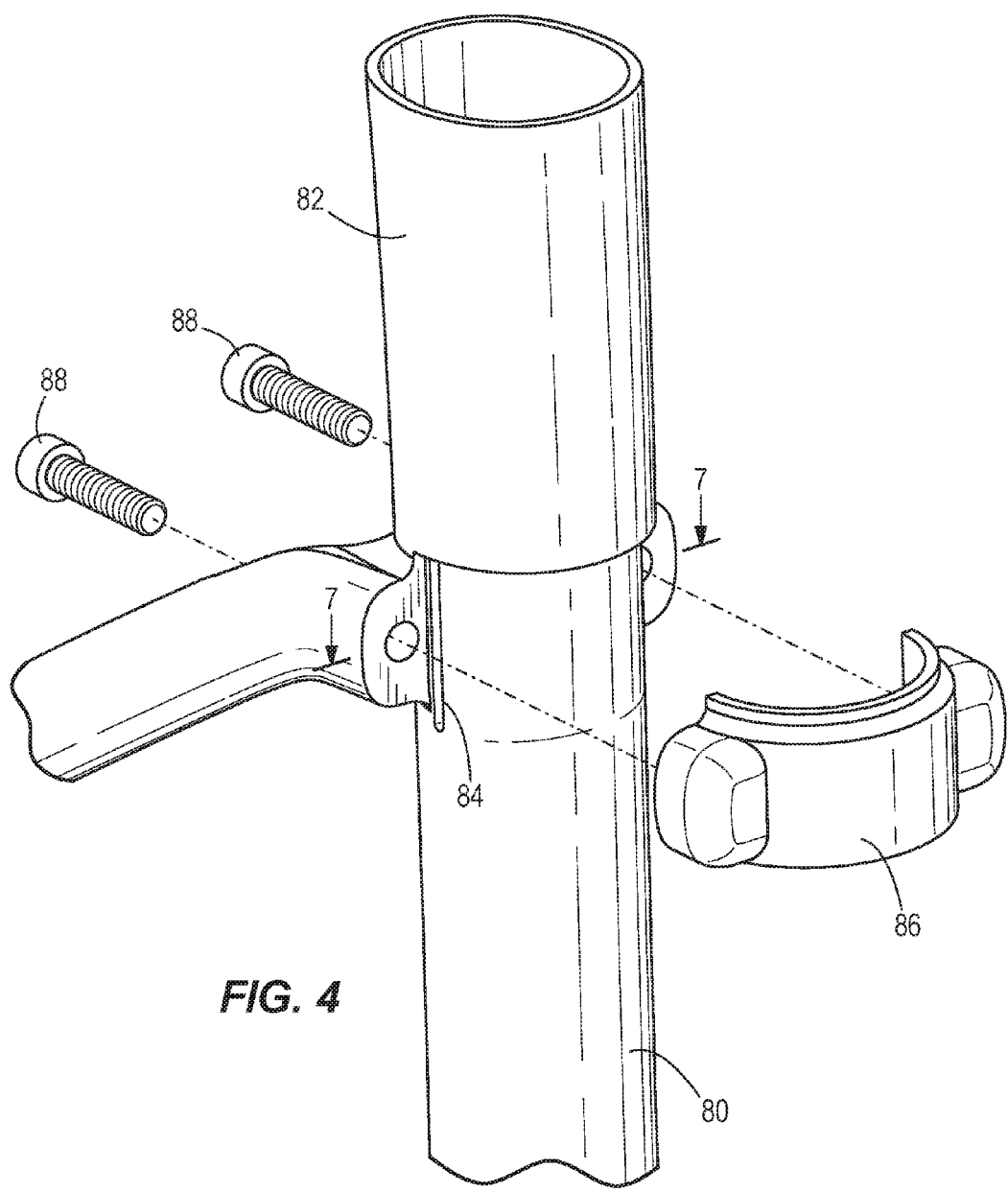
FIG. 4 is an exploded front view of a second embodiment of the invention having a different clamping arrangement.
Figure 5:
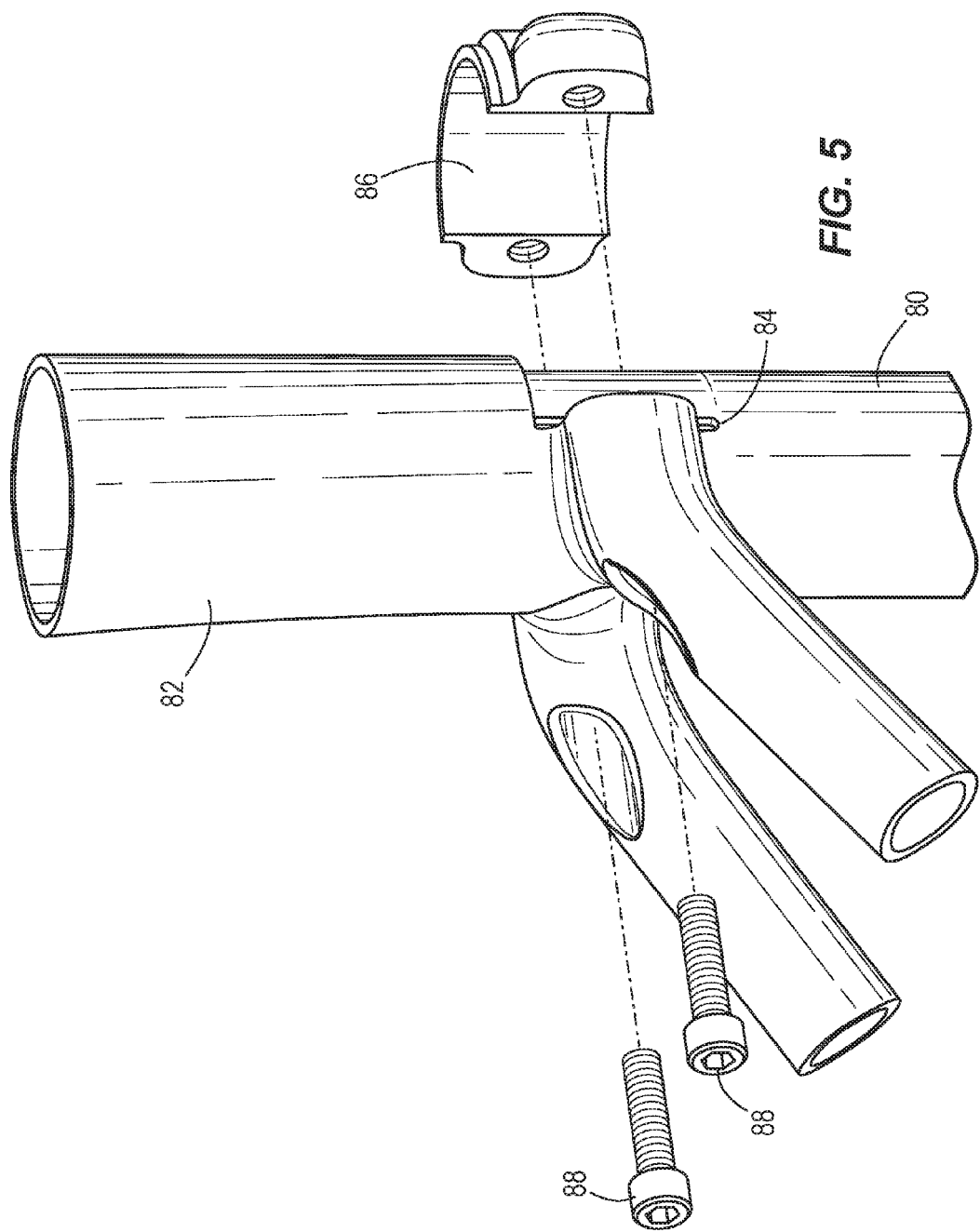
FIG. 5 is an exploded rear view of the second embodiment of FIG. 4.
Figure 6:
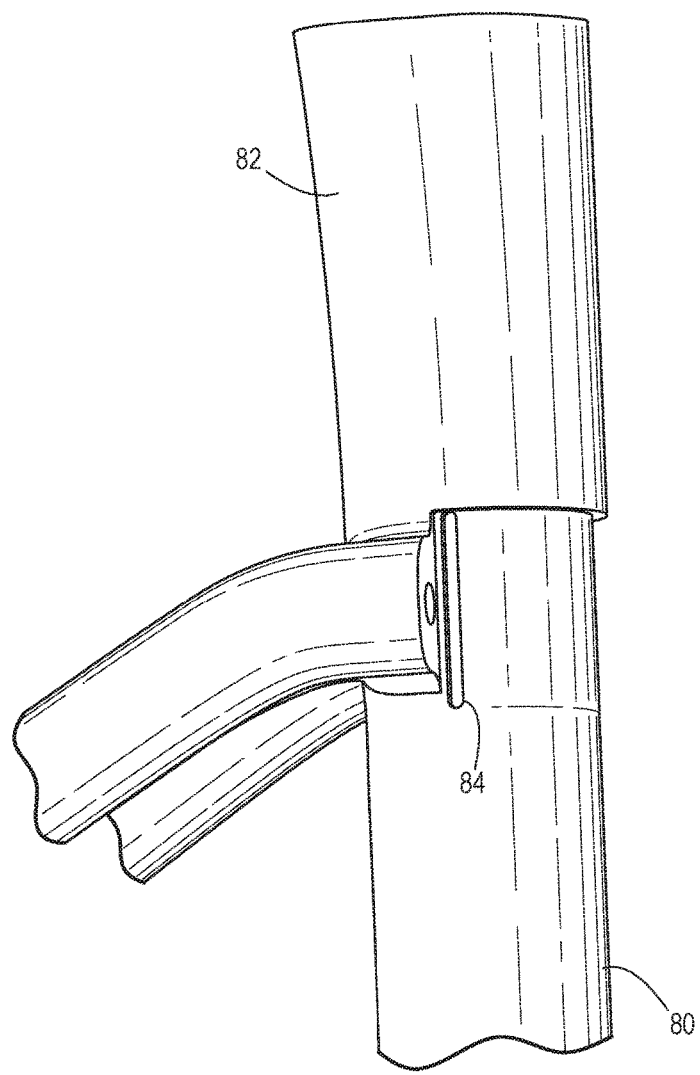
FIG. 6 illustrates the second embodiment with the clamp removed.
Figure 7:
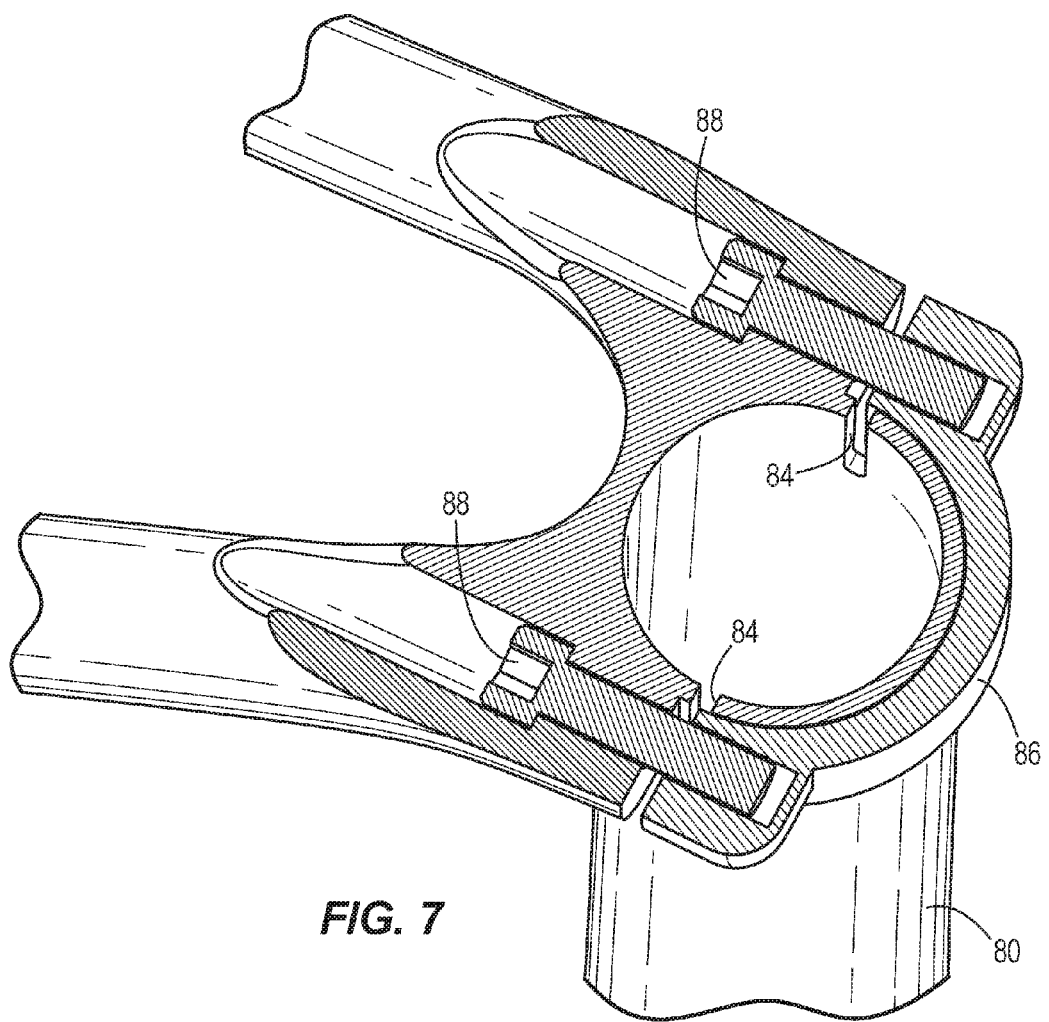
FIG. 7 is a section view of the second embodiment taken along line 7-7 in FIG. 4.

FIG. 1 illustrates a bicycle 10 having two wheels 12, a frame 14 supported on the wheels 12, handlebars 16 for steering the bicycle 10, and a seat 18 for supporting the rider. The illustrated frame 14 includes a top tube 20, a down tube 22, a seat tube 24, two chainstays 26, and two seatstays 28, as is known in the art. A crankset 30 defines a crank axis 32 and supports two pedals. A seat post 34 is partially positioned inside the seat tube 24 and protrudes upwardly from the seat tube 24 to support the seat 18.

The seatstays 28 are coupled to the seat tube 24 at a location spaced a distance D downwardly from an upper end 36 of the seat tube 24. In the illustrated embodiment, the distance D is about 70 mm, which is about 10% of an effective length L of the seat tube 24 (measured from the top of the seat tube 24 to the crank axis 32).

Referring to FIGS. 2-3, the seat post 34 is secured to the seat tube 24 by clamping at a clamping location 38 spaced from the upper end 36 of the seat tube 24 by the distance D. In order to accomplish this, the illustrated seat tube 24 includes a slot 40 extending from the upper end 36 to a location slightly below the clamping location 38 where the seatstays 28 are connected to the seat tube 24. The seatstays 28 further include a laterally extending hole 42 that is dimensioned to receive a fastener (e.g., a bolt and nut) to facilitate clamping the seat tube 24 to the seat post 34. Alternatively, the slot could be a shorter, closed slot and not extend all the way to the upper end of the seat tube (i.e., extend from slightly below the clamping location 38 to slightly above the clamping location 38). Other ways of clamping the seat post to the seat tube could instead be used.

The upper end 36 of the seat tube 24 includes a flared portion 44 that defines a gap G between a rear wall 46 of the flared portion 44 and the seat post 34. The illustrated gap is about 1 mm, which is about 3.7% of the front/rear width W of the seat post 34. It is noted that FIGS. 1-3 exaggerate the size of the gap for illustration purposes and are not to scale. The opposing side walls 48 and front wall 50 of the flared portion 44 are substantially parallel to each other and define a much smaller gap between the walls 48,50 and the seat post 34. In the illustrated embodiment, the smaller gap has a dimension of zero, such that the side and front walls 48,50 of the flared portion 44 are substantially flush against the seat post 34 in the unstressed condition.

By virtue of the above-described flared portion 44 and gap G, the seat post 34 can flex rearwardly and downwardly to facilitate the absorption of shock and vibration travelling from the rear wheel 12 and through the seatstays 28. On the other hand, the close fit between the seat post 34 and the sidewalls 48 of the flared portion 44 provides lateral stability between the frame 14 and the seat post 34.

The illustrated arrangement further includes a resilient bushing 52 positioned in the gap G between the seat post 34 and the flared portion 44 of the seat tube 24. The bushing 52 is made from a suitable elastomeric material, such as thermoplastic polyurethane. The bushing 52 enhances the damping of vibrations from the seatstays 28, and further provides additional support to the seat post 34. The bushing 52 also inhibits the entry of contaminants, such as dirt and water, into the seat tube. In the event that a rider perceives that the seat post 34 is flexing too little or too much, the bushing 52 can be replaced with a softer or stiffer bushing to achieve the desired amount of flexing of the seat post 34.

FIGS. 4-7 illustrate an alternative clamping arrangement for securing the seat post to the seat tube 80. In this embodiment, there is no slot in the rear of the flared portion 82. Instead, the sides of the seat tube 80 each include a closed slot 84 in the clamping area, which allows the seat tube 80 to more readily flex. A clamping member 86 is secured to the seat tube 80 by two threaded fasteners 88 to compress the seat tube 80 onto the seat post (not shown in FIGS. 4-7). Although the fasteners 88 are depicted as being inserted from the rear of the seat stay into blind holes in the clamping member 86, one of ordinary skill will recognize that the assembly could instead be reversed with through holes in the clamping member and threaded blind holes in the seat stays such that the fasteners are inserted through the clamping member from the front and threaded into the seat stays.

Various features and advantages of the invention are set forth in the following claims.

What is claimed is:

1. A bicycle comprising:
    front and rear wheels;
    a frame supported on the front and rear wheels, the frame including a seat tube with an upper end having a flared portion with a rear wall and a side wall;
    a seat post positioned at least partially inside the seat tube and being secured to the seat tube at a securing location spaced from the upper end, wherein the flared portion defines a first gap between the rear wall and the seat post and the side wall is spaced from the seat post by a second gap that is smaller than the first gap,
    wherein the seat tube tapers from the flared portion toward the securing location, and
    wherein the first gap and the securing location are configured such the seat post can flex within the seat tube in a rearward and downward direction.

2. A bicycle as claimed in claim 1, wherein the seat post has a front-to-rear width and the first gap is at least 1% of the front-to-rear width.

3. A bicycle as claimed in claim 2, wherein the first gap is at least 2% of the front-to-rear width.

4. A bicycle as claimed in claim 2, wherein the first gap is at least 3% of the front-to-rear width.

5. A bicycle as claimed in claim 1, wherein the second gap has a dimension that is substantially zero.

6. A bicycle as claimed in claim 5, wherein the seat tube includes a slot extending from the upper end to the securing location.

7. A bicycle as claimed in claim 1, wherein the frame further includes a seatstay coupled to the seat tube substantially at the securing location.

8. A bicycle as claimed in claim 1, wherein the frame further includes a crank axis and the seat tube has an effective length from the crank axis to the upper end, and wherein the securing location is spaced from the upper end by a distance that is at least 5% of the effective length.

9. A bicycle as claimed in claim 1, wherein the seat tube includes opposing slots at the securing location, and wherein the bicycle further includes a clamping member positioned at the securing location to secure the seat post relative to the seat tube.

10. A bicycle as claimed in claim 1, further comprising a resilient bushing positioned in the first gap.

* * * * *